(12) United States Patent
Jung

(10) Patent No.: US 10,027,002 B2
(45) Date of Patent: Jul. 17, 2018

(54) VEHICLE BATTERY PACK WITH IMPROVED COOLING EFFICIENCY

(71) Applicant: LG CHEM, LTD., Seoul (KR)

(72) Inventor: Seung-Hun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 116 days.

(21) Appl. No.: 14/783,342

(22) PCT Filed: Feb. 23, 2015

(86) PCT No.: PCT/KR2015/001716
§ 371 (c)(1),
(2) Date: Oct. 8, 2015

(87) PCT Pub. No.: WO2015/126204
PCT Pub. Date: Aug. 27, 2015

(65) Prior Publication Data
US 2016/0072164 A1    Mar. 10, 2016

(30) Foreign Application Priority Data

Feb. 24, 2014 (KR) .......................... 10-2014-0021283
Feb. 23, 2015 (KR) .......................... 10-2015-0025099

(51) Int. Cl.
*H01M 10/655* (2014.01)
*H01M 10/625* (2014.01)
(Continued)

(52) U.S. Cl.
CPC ......... *H01M 10/6555* (2015.04); *B60L 11/18* (2013.01); *H01M 2/1077* (2013.01);
(Continued)

(58) Field of Classification Search
None
See application file for complete search history.

(56) References Cited

U.S. PATENT DOCUMENTS 5,756,227 A *   5/1998   Suzuki .................... F28F 3/02
                                                      429/120
9,203,064 B2   12/2015   Lee et al.
(Continued)

FOREIGN PATENT DOCUMENTS

CN      102356505 A      2/2012
JP      2004-227986 A    8/2004
(Continued)

OTHER PUBLICATIONS

International Search Report, issued in PCT/KR2015/001716, dated May 13, 2015.

*Primary Examiner* — Jonathan Crepeau
(74) *Attorney, Agent, or Firm* — Birch, Stewart, Kolasch & Birch, LLP

(57) ABSTRACT

The present disclosure discloses a battery pack for a vehicle. The battery pack according to the present disclosure includes at least one secondary battery including a negative electrode plate, a separator, and a positive electrode plate, and at least one cooling pin which comes into contact with a casing of the secondary battery to cool the secondary battery, wherein at least one end of the cooling pin comes into contact with a car body. The cooling pin dissipates heat generated from the secondary battery through the car body. Thus, the need for a separator refrigerant, a movement channel of a refrigerant, and a pump is eliminated.

4 Claims, 3 Drawing Sheets

(51) Int. Cl.
  *H01M 2/10* (2006.01)
  *H01M 10/6555* (2014.01)
  *H01M 10/6551* (2014.01)
  *H01M 10/613* (2014.01)
  *B60L 11/18* (2006.01)

(52) U.S. Cl.
  CPC ....... *H01M 2/1083* (2013.01); *H01M 10/613* (2015.04); *H01M 10/625* (2015.04); *H01M 10/6551* (2015.04); *H01M 2220/20* (2013.01)

(56) References Cited

U.S. PATENT DOCUMENTS

| | | | |
|---|---|---|---|
| 2012/0094166 A1 | 4/2012 | Lee et al. | |
| 2012/0177965 A1 | 7/2012 | Lee et al. | |
| 2012/0263988 A1* | 10/2012 | Obasih | H01M 10/6556 429/98 |
| 2013/0224549 A1* | 8/2013 | Lee | H01M 10/5004 429/99 |

FOREIGN PATENT DOCUMENTS

| | | |
|---|---|---|
| JP | 2009-301877 A | 12/2009 |
| KR | 10-1997-0031067 A | 6/1997 |
| KR | 10-2011-0030225 A | 3/2011 |
| KR | 10-1116892 B1 | 6/2012 |
| KR | 10-2013-0081027 A | 7/2013 |

\* cited by examiner

VEHICLE BATTERY PACK WITH IMPROVED COOLING EFFICIENCY

TECHNICAL FIELD

The present disclosure relates to a battery pack for a vehicle, and more particularly, to a battery pack for a vehicle that may have high cooling efficiency at a low cost.

The present application claims priority to Korean Patent Application No. 10-2014-0021283 filed in the Republic of Korea on Feb. 24, 2014 and Korean Patent Application No. 10-2015-0025099 filed in the Republic of Korea on Feb. 23, 2015, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV) or a hybrid electric vehicle (HEV) and an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a positive electrode current collector and a negative electrode current collector, a separator, an active material, and an electrolyte solution, and allows repeated charging and discharging by electrochemical reactions between the constituent elements.

In addition to this basic structure, the battery pack further includes a battery management system (BMS) to monitor and control a state of a secondary battery by applying an algorithm for control of power supply to a driving load such as a motor, measurement of electrical characteristic values such as current or voltage, charge/discharge control, voltage equalization control, and state of charge (SOC) estimation.

Recently, with the growing need for a high-capacity structure as well as utilization as an energy storage source, there is an increase in demand for a battery pack of a multi-module structure in which a plurality of battery modules including a plurality of secondary batteries connected in series and/or in parallel are assembled.

Because a battery pack of a multi-module structure is designed to have a plurality of secondary batteries arranged with a high density in a narrow space, it is important to easily discharge heat generated from the respective secondary batteries. One of the various methods of discharging heat generated from a secondary battery, an indirect cooling method is disclosed in Japanese Patent Application Publication No. 2009-301877.

FIG. 1 is a schematic exploded perspective view illustrating the design of a battery pack including a cooling pin and a secondary battery.

The indirect cooling method is a cooling method using a refrigerant through the cooling pin 2 in contact with a casing of the secondary battery 1. Heat generated from the secondary battery 1 is transferred through the cooling pin 2, and the cooling pin 2 transfers the heat to the refrigerant again. Generally, a heat sink 3 is formed on the top or bottom of the cooling pin 2 for quick heat exchange with the refrigerant.

A cooling method using a refrigerant as described above needs a separate space such as a passage along which a refrigerant moves. Also, the cooling method using a refrigerant needs a separate device such as a pump for moving a refrigerant. Thus, when a battery pack employs a cooling method using a refrigerant, not only a space for a secondary battery but also an additional space is necessary, and because an additional cooling system is mounted, an overall size of the battery pack increases and an energy density per unit volume of the battery pack reduces. Also, complexity of a cooling system results in an increase in failure factor such as a coolant leakage, clogging of a channel in which a refrigerant flows, and a failure in a pump or a motor for moving a refrigerant. Furthermore, due to having to mount an additional cooling system, an additional cost as well as a cost for fabricating a secondary battery is required. As a result, the price of the battery pack increases.

DISCLOSURE

Technical Problem

The applicant addressed a problem of a cooling system based on an indirect cooling method used in a battery pack. The applicant conceived an idea of developing a cooling system which is less complex than a traditional cooling system and needs a small space.

The present disclosure is designed to address the above issue of the related art, and therefore, the present disclosure is directed to providing a battery pack for a vehicle that has a simple structure and high cooling efficiency at a low cost.

The other objects and advantages of the present disclosure will be apparent from the following description and the exemplary embodiments of the present disclosure. Also, it will be readily understood that the objects and advantages of the present disclosure are realized by the means and combinations thereof set forth in the appended claims.

Technical Solution

To achieve the above object, a battery pack for a vehicle according to the present disclosure includes at least one secondary battery including a negative electrode plate, a separator, and a positive electrode plate, and at least one cooling pin which comes into contact with a casing of the secondary battery to cool the secondary battery, wherein at least one end of the cooling pin comes into contact with a car body.

According to one embodiment of the present disclosure, the battery pack for a vehicle may further include a thermal interface material interposed between the cooling pin and the car body.

The battery pack according to the present disclosure may further include a pack case which surrounds the secondary battery. In this instance, the cooling pin may be exposed outside of the pack case.

According to one embodiment of the present disclosure, one end of the cooling pin may have a bent shape to increase a contact surface with the car body.

The battery pack according to the present disclosure may be an element of a vehicle including the battery pack for a vehicle and a motor which runs with power supplied from the battery pack.

Advantageous Effects

The battery pack according to the present disclosure does not need a separate channel along which a refrigerant moves and a separate pump for moving the refrigerant. Thus, an energy density of the battery pack may be improved as compared to a related art. Also, the risk of leakage of a refrigerant and a failure in a pump is reduced or eliminated. Further, heat is dissipated through a car body in contact with outdoor air all the time, resulting in high cooling efficiency.

The present disclosure may have a variety of other effects, and the other effects of the present disclosure can be understood by the following description, and will be apparent from the exemplary embodiments of the present disclosure.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
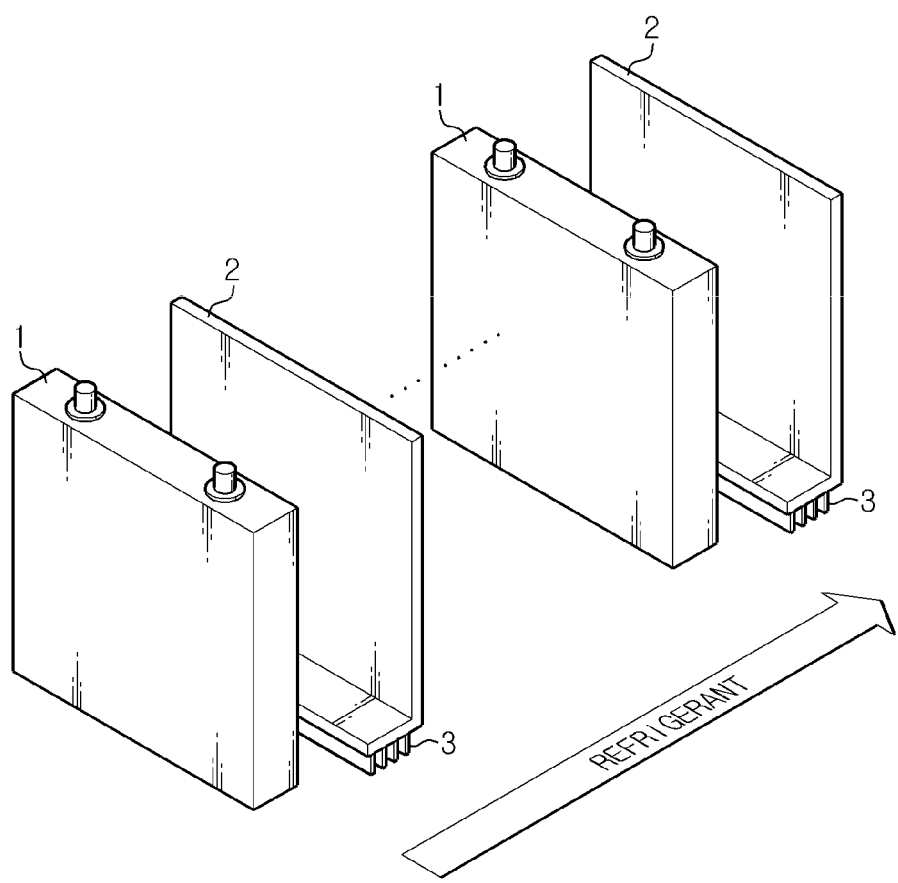
FIG. 1 is a schematic exploded perspective view illustrating the design of a battery pack including a cooling pin and a secondary battery.
Figure 2:
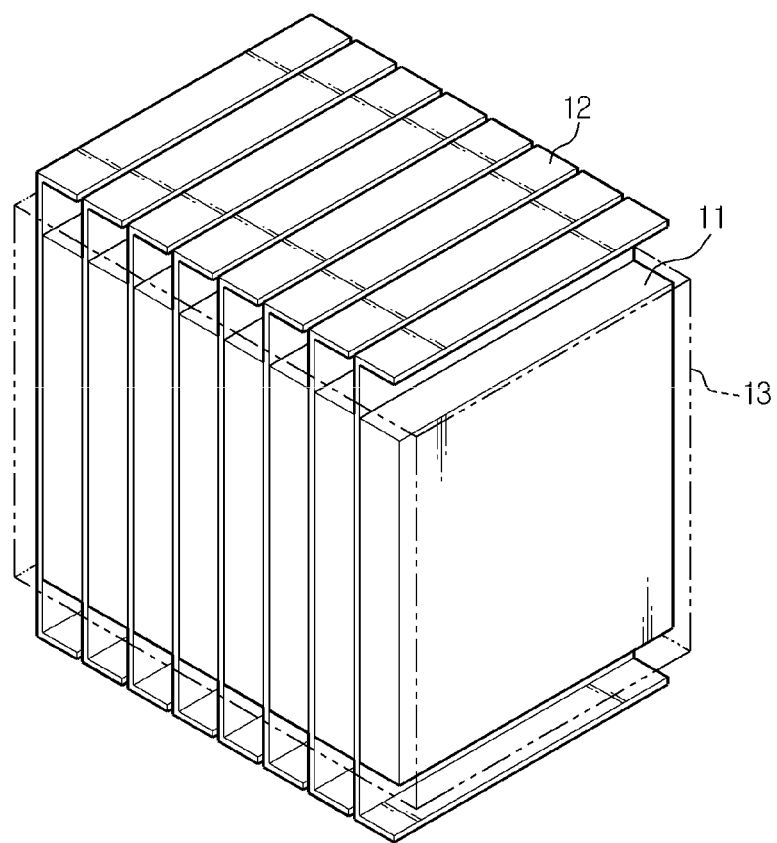
FIG. 2 is a schematic perspective view illustrating the design of a battery pack according to the present disclosure.

FIG. 2 is a schematic perspective view illustrating the design of a battery pack according to the present disclosure.

Referring to FIG. 2, the battery pack 10 according to the present disclosure includes a secondary battery 11 and a cooling pin 12. The battery pack 10 according to the present disclosure may be a battery pack for a vehicle that is mounted in a vehicle. The following description is made under the premise that the battery pack 10 is mounted in a car.

The secondary battery 11 has a structure in which unit cells are stacked in a repeated manner, and each unit cell includes a negative electrode plate, a separator, and a positive electrode plate. The battery pack 10 includes at least one secondary battery 11, and the secondary battery 11 is not limited to a particular type. Each secondary battery 11 may construct a lithium ion battery, a lithium polymer battery, a nickel cadmium battery, a nickel hydrogen battery and a nickel zinc battery that are rechargeable and need to consider a charge or discharge voltage. Also, a number of secondary batteries 11 included in the battery pack 10 may be variously set based on a required output voltage or charge/discharge capacity. However, the present disclosure is not limited by a type, an output voltage and a charge capacity of the secondary battery 11. Also, the present disclosure is not limited by a method of connecting the secondary battery 11.

The secondary battery is classified into a pouch-type secondary battery, a cylindrical secondary battery, and a prismatic secondary battery based on a type of a casing. Among these types of secondary batteries, a pouch-type secondary battery has advantages of easy fabrication, a low manufacturing cost, and being easy to construct a high-capacity secondary battery pack by electrically connecting a plurality of unit cells in series and/or in parallel, over a can-type secondary battery.

The cooling pin 12 comes into contact with the casing of the secondary battery 11 to cool the secondary battery 11. A number of the cooling pins 12 may be equal to or smaller or larger than a number of the secondary batteries 11. The cooling pin 12 is made from a metal, preferably, aluminum or copper having high thermal conductivity.

In this instance, the cooling pin 12 and the secondary battery 11 should be electrically isolated from each other. The casing of the secondary battery 11 is made from an insulating material to offer assistance in achieving insulation between the cooling pin 12 and the secondary battery 11. Preferably, to improve the insulation between the cooling pin 12 and the secondary battery 11, a plate or a thin film of an insulating material may be interposed between the cooling pin 12 and the secondary battery 11. In this instance, the plate or thin film is preferably formed from a material having high electrical insulation and high thermal conductivity.

The battery pack 10 according to the present disclosure may further include a pack case 13 which surrounds the secondary battery 11. In this instance, the cooling pin 12 is exposed outside of the pack case 13.

The battery pack 10 according to the present disclosure may be designed such that at least one end of the cooling pin 12 comes into contact with a car body.

Figure 3:
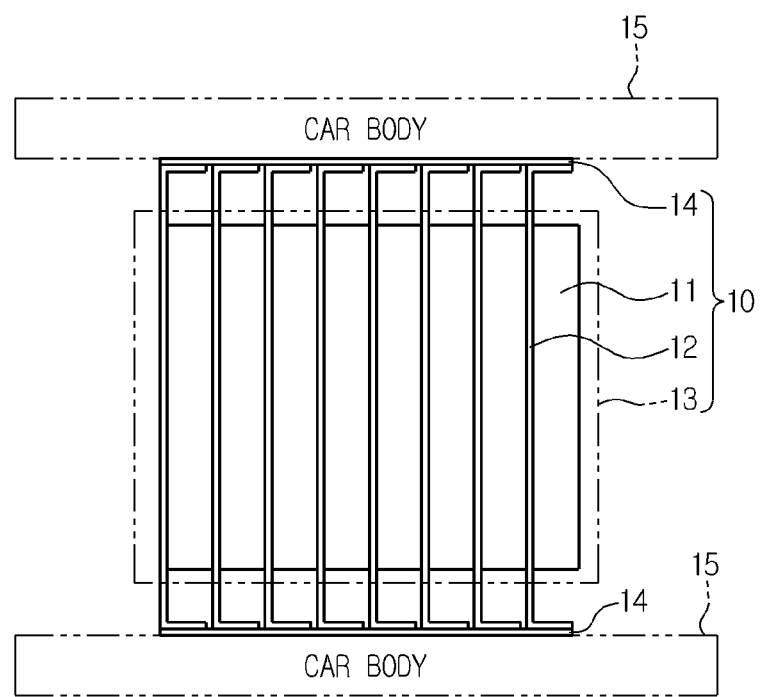
FIG. 3 is a schematic diagram illustrating an example of a battery pack according to the present disclosure mounted in a vehicle.

FIG. 3 is a schematic diagram illustrating an example of the battery pack according to the present disclosure mounted in a vehicle.

Referring to FIG. 3, it can be seen that the top and bottom of the cooling pin 12 come into contact with a car body 15. The cooling pin 12 absorbs heat generated from the secondary battery 11. Also, the heat absorbed by the cooling pin 12 is transferred to the car body 15. As described above, according to the related art, the cooling pin absorbs heat generated from the secondary battery 11 and the cooling pin 12 discharges out the heat using a complex cooling system by the medium of a separate refrigerant. However, the cooling system of the present disclosure allows heat generated from the secondary battery 11 through a contact of the cooling pin 12 and the car body to be discharged out through the car body 15 by a thermal conduction phenomenon. The present disclosure does not need a separate channel along which a refrigerant moves and a separate pump for moving a refrigerant. Thus, an energy density of the battery pack may be improved as compared to the related art. Also, the risk of leakage of a refrigerant and a failure in a pump is reduced or eliminated. Further, heat is dissipated through the car body in contact with outdoor air all the time, resulting in high cooling efficiency.

According to one embodiment of the present disclosure, one end of the cooling pin 12 has a bent shape to increase a contact surface with the car body 15. That is, the cooling pin 12 may be bent at least once to maximize the contact surface with the car body 15.

Preferably, one end of each of a plurality of cooling pins 12 included in the battery pack 10 may be bent in the same direction. That is, as shown in FIGS. 2 and 3, the cooling pins 12 may be bent side by side in the right direction. As the cooling pins 12 are bent side by side in the same direction, the cooling pins 12 may easily come into contact with the car body 15 and maintain the contact with the car body 15 for a long term.

According to one embodiment of the present disclosure, a thermal interface material (TIM) 14 may be interposed between the cooling pin 12 and the car body 15. Preferably, the TIM 14 has a higher thermal conductivity coefficient than the cooling pin 12, and to maximize the thermal conductivity, the TIM 14 may be in the shape of a plate or a thin film having a wide contact area. An example of the TIM may include a material interposed between a microprocessor of a personal computer (PC) and a heat sink.

Preferably, the TIM 14 interposed between the cooling pin 12 and the car body 15 may come into contact with the plurality of cooling pins 12 and the car body 15 at the same time as one unit. Because the car body 15 has different temperature for each part or location, a cooling temperature of the cooling pin 12 may change based on parts of the car body 15 with which the cooling pins 12 come into contact. Thus, one TIM 14 is preferably interposed between the plurality of cooling pins 12 and the car body 15 to allow the cooling pins 12 to cool each of the secondary batteries 11 to a uniform temperature. Through this, the battery pack 11 may uniformly cool the secondary battery 11 even though the battery pack 11 is installed in any part of the car body 15.

According to one embodiment, the cooling pin 12 and the car body 15 may be connected by adhesion or bolt coupling. Also, when the TIM is interposed between the cooling pin 12 and the car body 15, the cooling pin 12 and the TIM 14, or the TIM 14 and the car body 15 may be connected by adhesion or bolt coupling. When the TIM 14 is interposed, the cooling pin 12, the TIM 14 and the car body 15 may be connected by applying an adhesive onto both surfaces of the TIM 14, and the contacted state may be maintained by integrally coupling the cooling pin 12, the TIM 14, and the car body 15 by a bolt.

The battery pack 10 according to the present disclosure may be an element of a vehicle including the battery pack 10 and a motor which runs with power supplied from the battery pack 10.

Hereinabove, the present disclosure has been described by limited embodiments and drawings, but the present disclosure is not limited thereto and it should be understood that various changes and modifications may be made by an ordinary person skilled in the art within the spirit and scope of the disclosure and the appended claims and their equivalents.

What is claimed is:

1. A battery pack for a vehicle, comprising:
    a plurality of secondary batteries, each secondary battery including a negative electrode plate, a separator, and a positive electrode plate; and
    a plurality of cooling pins, each cooling pin including a body portion which contacts a casing of at least one secondary battery to cool the at least one secondary battery,
    wherein each cooling pin includes end portions that are substantially planar, the end portions of each cooling pin extend from the body portion in a same direction and the end portions are perpendicular to an extension direction of the body portion,
    wherein a side surface of each end portion of each cooling pin is configured to come into direct contact with a vehicle body,
    wherein the end portions of each cooling pin are spaced from a respective one of the plurality of secondary batteries,
    wherein the end portions of each cooling pin extend substantially across an entire width of the respective one of the plurality of secondary batteries and the respective secondary battery is located between respective end portions of the respective cooling pin, and
    wherein one of the plurality of cooling pins is provided between each pair of adjacent secondary batteries.

2. The battery pack for a vehicle according to claim 1, further comprising:
    a pack case which surrounds the plurality of secondary batteries,
    wherein the plurality of cooling pins extend through the pack case.

3. A vehicle comprising:
    a battery pack, comprising:
        at least one secondary battery comprising a negative electrode plate, a separator, and a positive electrode plate; and
        at least one cooling pin including a body portion which contacts a casing of the at least one secondary battery to cool the at least one secondary battery;
        wherein the at least one cooling pin includes end portions that are substantially planar, the end portions of the at least one cooling pin extend from the body portion in a same direction and the end portions are perpendicular to an extension direction of the body portion,
        wherein the end portions of the at least one cooling pin are spaced from a respective one of the at least one secondary battery,
        wherein the end portions of the at least one cooling pin extend substantially across an entire width of a respective one of the at least one secondary battery and the at least one secondary battery is located between respective end portions of the at least one cooling pin, and
        wherein the at least one cooling pin includes a plurality of cooling pins;
    a vehicle body, wherein a side surface of each end portion of each cooling pin comes into direct contact with the vehicle body; and
    a motor which runs with power supplied from the battery pack.

4. The battery pack according to claim 1, wherein the body portion of each cooling pin contacts an entire length of the casing of the respective secondary battery.

* * * * *